United States Patent
Factor et al.

(10) Patent No.: US 7,401,102 B2
(45) Date of Patent: Jul. 15, 2008

(54) MANAGEMENT OF GLOBAL COUNTERS IN TRANSACTIONS

(75) Inventors: Michael Factor, Haifa (IL); Ohad Rodeh, Tel Aviv (IL); Liran Schour, Tel Aviv-Jaffa (IL)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 10/968,479

(22) Filed: Oct. 19, 2004

(65) Prior Publication Data

US 2006/0089951 A1 Apr. 27, 2006

(51) Int. Cl.
*G06F 17/30* (2006.01)
(52) U.S. Cl. ............................ 707/202; 714/2; 711/161; 711/162
(58) Field of Classification Search ................. 707/200, 707/206, 202; 711/170, 173
See application file for complete search history.

(56) References Cited

U.S. PATENT DOCUMENTS

| | | | |
|---|---|---|---|
| 5,524,205 A | | 6/1996 | Lomet et al. |
| 6,052,695 A | * | 4/2000 | Abe et al. ................... 707/202 |
| 6,353,834 B1 | | 3/2002 | Wong et al. |
| 6,453,319 B1 | * | 9/2002 | Mattis et al. ................ 707/100 |
| 6,571,259 B1 | * | 5/2003 | Zheng et al. ................ 707/205 |
| 6,704,839 B2 | | 3/2004 | Butterworth et al. |
| 2002/0032691 A1 | * | 3/2002 | Rabii et al. ................. 707/200 |
| 2003/0009477 A1 | * | 1/2003 | Wilding et al. ........... 707/104.1 |
| 2003/0061537 A1 | | 3/2003 | Cha et al. |

OTHER PUBLICATIONS

Jay Menon, Larry Stockmeyer: An Age Threshold Algorithm for Garbage Collection in Log-structured Arrays and File Systems, IBM Research, 1998 http://citeseer.ist.psu.edu/cache/papers/cs/15659/http:zSzzSzwww.almaden.ibm.cornzSzeszSzpeoplezSzstockzSzagerj.pdf/menon98agethreshold.pdf.

* cited by examiner

*Primary Examiner*—Hosain Alam
*Assistant Examiner*—Amy Ng (57) ABSTRACT

A method for tracking transactions performed on a non-volatile storage medium. The medium consists of a plurality of storage ranges. The method includes assigning respective local counters to the plurality of storage ranges, the local counters having respective local counter values, and storing the local counter values together in a selected region of the non-volatile storage medium. The method further includes updating the respective local counter values stored in the selected region responsively to the transactions performed on the storage ranges to which the local counters are respectively assigned. The method also includes reading and combining the local counter values from the selected region in order to determine a global counter value with respect to the non-volatile storage medium.

8 Claims, 5 Drawing Sheets

MANAGEMENT OF GLOBAL COUNTERS IN TRANSACTIONS

FIELD OF THE INVENTION

The present invention relates generally to data transactions, and specifically to management of counters used in the transactions.

BACKGROUND OF THE INVENTION

A transaction is assumed to be a sequence of one or more computer operations, also herein termed computer steps, performed by a computing system, which change a state of the system. Methods for processing transactions, and in particular for recovering "gracefully" from a failure in such processing, are known in the art. *Transaction Processing: Concepts and Techniques*, by Gray and Reuter, published by Morgan Kaufmann Publishers, San Mateo Calif. (1993), describes transactions and their processing in detail, and sections 1.2 and chapter 10, respectively entitled "What Is a Transaction Processing System," and "Transaction Manager Concepts," are incorporated herein by reference.

As stated in the above-referenced section 1.2, a transaction has the properties of Atomicity, Consistency, Isolation, and Durability (ACID). The properties are described in section 1.2, and may be summarized as follows:

Atomicity Either all operations happen or none happen.
Consistency The transaction must result in a correct transformation of the state. The transaction must be a "correct program."
Isolation Even though transactions execute concurrently, it appears to each transaction, T, that others executed either before T or after T.
Durability Once a transaction completes successfully (commits), its changes to the state survive failures.

A transaction manager, which may comprise one or more sub-managers, depending on the computing system in which the transactions are being executed, monitors the progress of the transactions. By monitoring the transactions, the manager ensures that the ACID properties are complied with and also enables the possibility of a graceful recovery if a failure occurs during the transaction process.

Chapter 10 of *Transaction Processing: Concepts and Techniques* describes a "DO-UNDO-REDO" protocol, in which information termed a transaction log or journal is stored during the transaction process (the "DO" phase). Typically, the transaction manager periodically performs a checkpoint operation which writes from volatile storage to stable storage log records and system updates, and also writes to stable storage a checkpoint record indicating active transactions at the time of the checkpoint. The transaction manager can UNDO transactions——typically necessary if it is determined that one of the ACID properties has not been complied with—by undoing each of the logged individual actions of each transaction in a reverse order from the most recently logged action to the last checkpoint record. The transaction manager can REDO transactions—typically to recover from a system failure—by redoing logged actions in a forward direction from the last checkpoint record.

In monitoring transactions, the transaction manager also needs to update parameters associated with the transactions, such as counters that indicate space on a disk that is available for the transactions. A number of methods are known in the art for performing such updating.

U.S. Pat. No. 6,704,839 to Butterworth, et al., whose disclosure is incorporated herein by reference, describes a data storage system using two or more controllers. The disclosure points out that the controllers must cooperate with each other to update data structures such as a log structured array, a data structure holding free segments, and segment usage counters.

U.S. Pat. No. 5,524,205 to Lomet, et al., whose disclosure is incorporated herein by reference, describes a data processing system to optimize undo log usage. The disclosure describes system records that are used for bookkeeping of free space, and that are usually recorded in a collection of space management blocks.

U.S. Pat. No. 6,353,834 to Wong, et al., whose disclosure is incorporated herein by reference, describes a transactional message queuing system that stores messages and their states in a single file. The system is stated to be made possible by clustering all information together in a contiguous space on the same disk.

U.S. Patent Application 20030061537 to Cha, et al., whose disclosure is incorporated herein by reference, describes a parallelized database system. The system combines physical logging and replay of log records. The disclosure states that to lessen contention on a global counter, it is possible to partition the database and maintain a counter for each partition, each partition having space for its own counter.

An article titled "An age-threshold algorithm for garbage collection in log-structured arrays and file systems," by Menon et al., published as IBM Research Report RJ 10120 (1998), may be found at www.almaden.ibm.com. The article is incorporated herein by reference, and describes a method for choosing segments from a disk that are to be used for garbage collection. Inter alia, the method tracks free space available in each of the segments.

SUMMARY OF THE INVENTION

For transactions that use a common global counter there is a conflict. A common global counter has a value of a parameter of a system performing the transactions, such as the number of free data blocks in the system. The isolation requirements of the transactions imply that the counter is isolated to one transaction; in contrast, performing the transactions concurrently implies that the counter is available to all the transactions. One solution to the conflict locks the complete data structure of a system which is being acted on by a specific transaction until that transaction is complete. However, such a solution drastically decreases performance of the system, by serializing access to the global counter and thus serializing the concurrent transactions. This solution does have the advantage that recovery from failure is straightforward.

Another solution divides the global counter into a number of local counters, each of which gives a local counter value of a specific physical range of data blocks on a non-volatile medium such as a disk, each local counter being localized within its range. The global counter value is derived from the local counter values. A transaction locks only one of the ranges, and so while access to each of the local counters is serialized, transactions in different ranges may be concurrent. In recovering from a failure, the transaction manager reads ranges of the disk, and their local counter values, for transactions which have occurred since a last checkpoint was performed. The manager then recalculates the local counter values as necessary, and computes the global counter value from the local values. However, when this solution is used, the number of reads required to recover from a failure, and consequently the time to recover from the failure, is approximately linear with disk size.

Embodiments of the present invention mitigate the relationship between the number of reads required to recover from a failure and the disk size, and thus reduce the time required to recover from failure. In these embodiments, the local counters are all localized in one region of the disk, so that the time required to read values from all the local counters is minimized. The transaction manager recovers from a failure by determining from a log which counters may be incorrect. By checking the log, the manager reads only the disk ranges corresponding to the possibly incorrect local counters, recalculates the values of these local counters, and determines the global counter value from all the local counter values. Even if all the local counters need to be recalculated, the time for recovery is approximately proportional to the number of transactions in the log. This fact, together with the localization of the local counters, significantly reduces the time for recovery from a failure compared to systems known in the art.

There is therefore provided, according to an embodiment of the present invention, a method for tracking transactions performed on a non-volatile storage medium that includes a plurality of storage ranges, the method including:

assigning respective local counters to the plurality of storage ranges, the local counters having respective local counter values;

storing the local counter values together in a selected region of the non-volatile storage medium;

updating the respective local counter values stored in the selected region responsively to the transactions performed on the storage ranges to which the local counters are respectively assigned; and reading and combining the local counter values from the selected region in order to determine a global counter value with respect to the non-volatile storage medium.

Typically, the non-volatile storage medium includes a disk, and the selected region consists of a contiguous region and/or a cylinder of the disk.

In an alternative embodiment, the local counters each have a respective time of reading, and storing the local counter values includes locating the local counters within the selected region so that a total of the times of reading is a minimum.

The method may include writing a journal indicative of the storage ranges to the storage medium, wherein updating the respective local counter values includes reading the journal to determine the storage ranges.

In an exemplary embodiment, the local counter values include respective numbers of data blocks in the storage ranges, and the global counter value includes a total of the numbers.

In a disclosed embodiment each of the storage ranges includes a multiplicity of data blocks, and the method further includes generating a table including one or more states of each of the data blocks. Typically, the one or more states include a free state wherein the data block is available to be written to, an allocated state wherein the data block includes data, and a pre-allocated state from which the data block transfers to one of the free and the allocated states on or before completion of one of the transactions.

There is further provided, according to an embodiment of the present invention, apparatus for tracking transactions, including:

a non-volatile storage medium having a plurality of storage ranges; and a processing unit that is adapted to:

assign respective local counters to the plurality of storage ranges, the local counters having respective local counter values, store the local counter values together in a selected region of the non-volatile storage medium, update the respective local counter values stored in the selected region responsively to the transactions performed on the storage ranges to which the local counters are respectively assigned, and read and combine the local counter values from the selected region in order to determine a global counter value with respect to the non-volatile storage medium.

Typically, the non-volatile storage medium includes a disk, and the selected region includes a contiguous region of the disk and/or a cylinder of the disk.

In an alternative embodiment, the local counters each have a respective time of reading, and storing the local counter values consists of locating the local counters within the selected region so that a total of the times of reading is a minimum.

In one embodiment, the processing unit is adapted to write a journal indicative of the storage ranges to the storage medium, and updating the respective local counter values includes reading the journal to determine the storage ranges.

In a disclosed embodiment, the local counter values include respective numbers of data blocks in the storage ranges, and the global counter value includes a total of the numbers.

In an alternative embodiment, each of the storage ranges includes a multiplicity of data blocks, and the processing unit is adapted to generate a table including one or more states of each of the data blocks. Typically, the one or more states include a free state wherein the data block is available to be written to, an allocated state wherein the data block includes data, and a pre-allocated state from which the data block transfers to one of the free and the allocated states on or before completion of one of the transactions.

There is further provided, according to an embodiment of the present invention, a computer software product for tracking transactions performed on a non-volatile storage medium that includes a plurality of storage ranges, the product including a computer-readable medium having computer program instructions recorded therein, which instructions, when read by a computer, cause the computer to:

assign respective local counters to the plurality of storage ranges, the local counters having respective local counter values;

store the local counter values together in a selected region of the non-volatile storage medium;

update the respective local counter values stored in the selected region responsively to the transactions performed on the storage ranges to which the local counters are respectively assigned; and read and combine the local counter values from the selected region in order to determine a global counter value with respect to the non-volatile storage medium.

The present invention will be more fully understood from the following detailed description of the preferred embodiments thereof, taken together with the drawings, a brief description of which follows.

DETAILED DESCRIPTION OF EMBODIMENTS

Figure 1:
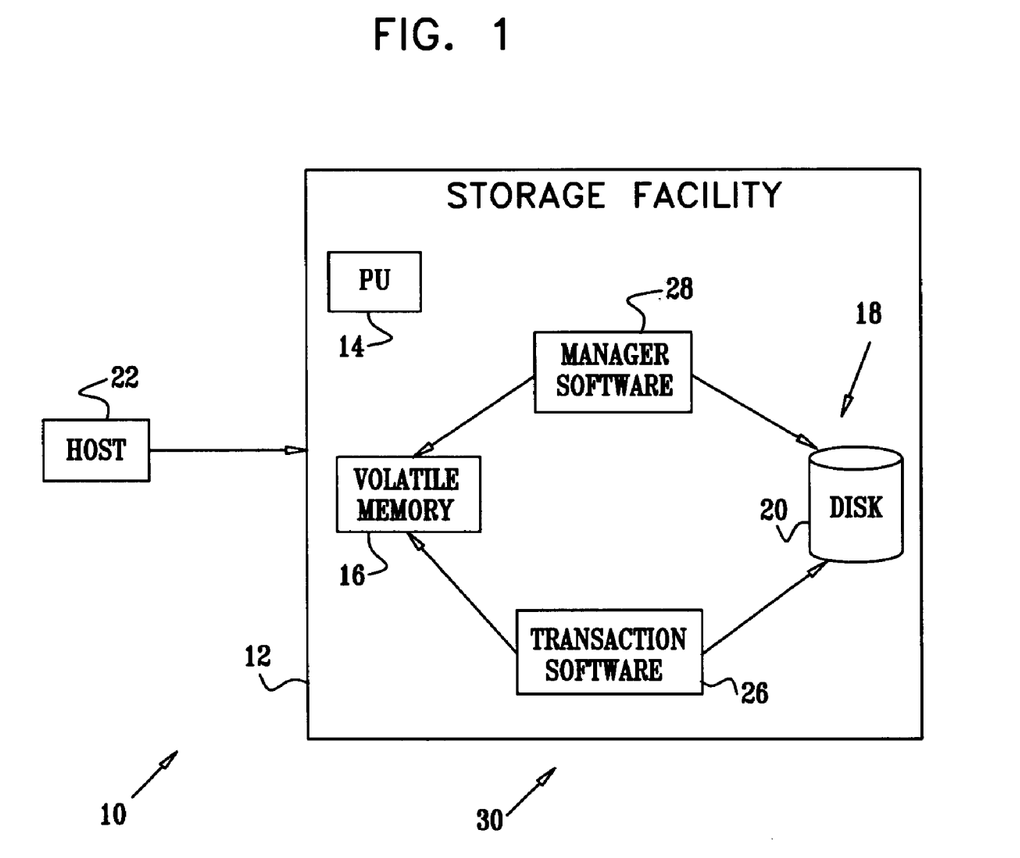
FIG. 1 is a schematic block diagram of a computing system, according to an embodiment of the present invention.

Reference is now made to FIG. 1, which is a schematic block diagram of a computing system 10, according to an embodiment of the present invention. System 10 comprises a data storage facility 12, which in turn comprises a processing unit (PU) 14 which operates the storage facility by communicating with volatile memory 16 and stable non-volatile storage media 18. Hereinbelow, by way of example, storage media 18 is assumed to comprise one disk 20, although it will be appreciated that the principles of the present invention are in no way limited to one disk, and equally apply to a storage media comprising substantially any number of magnetic disks or other type of media which are able to store data stably. A host 22 communicates with storage facility 12, typically using the latter to store data to and read data from one or more databases maintained by the computing system. In operating facility 12, PU 14 performs data transactions, each committed transaction having the ACID properties described in the Background of the Invention.

Memory 16 and/or media 18 have written to them, inter alia, transaction software 26 for performing the data transactions, as described hereinbelow. Software 26 may be provided to facility 12 as a computer software product in a tangible form on a computer-readable medium such as a CD-ROM, or as an electronic data transmission, or as a mixture of both forms. Memory 16 and/or media 18 also have written to them manager software 28 which enables PU 14 to operate as a transaction manager 30.

Figure 2:
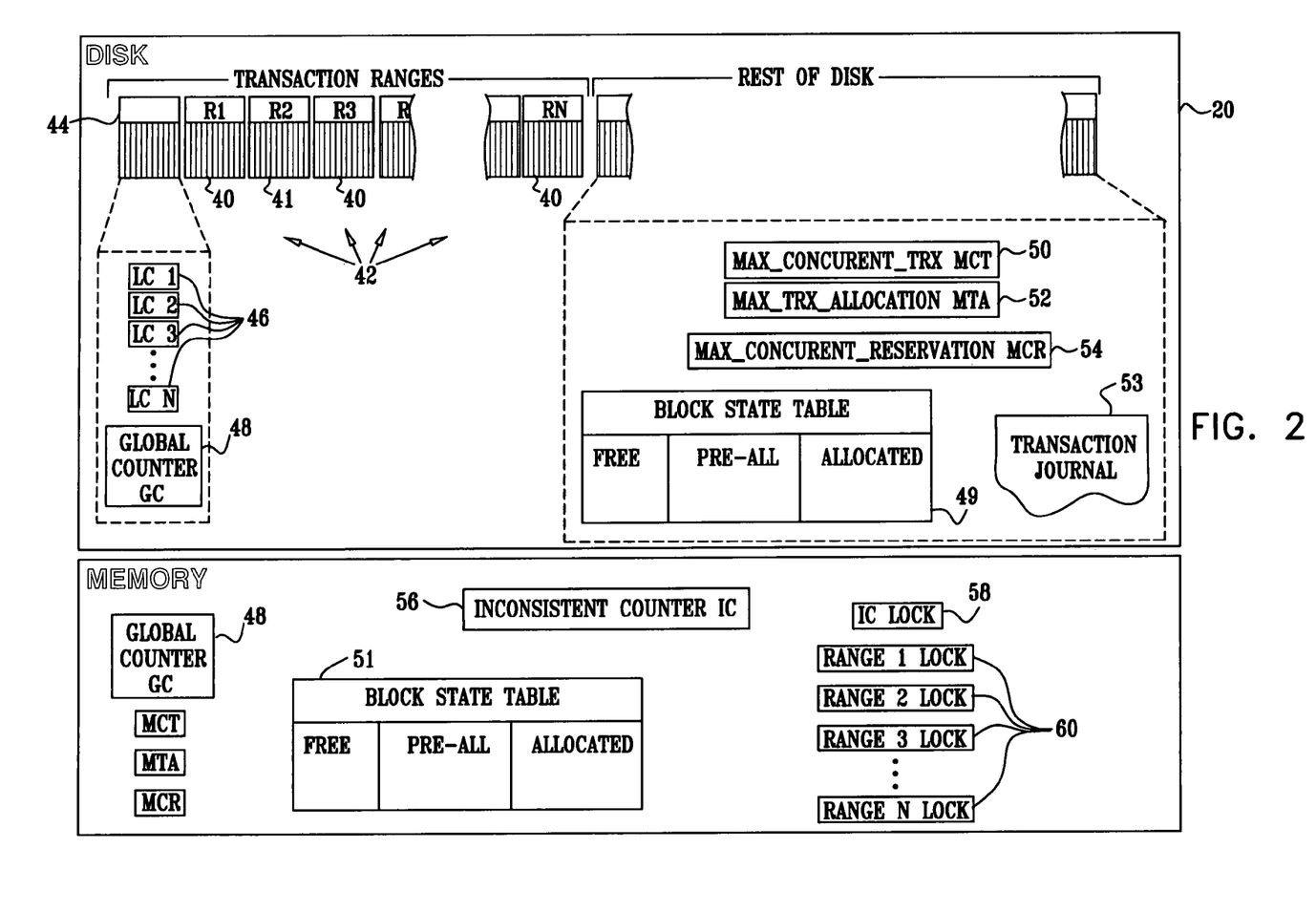
FIG. 2 is a schematic diagram showing data structures of a disk of the system of FIG. 1, and parameters stored in the disk and in a memory of the system, according to an embodiment of the present invention.

FIG. 2 is a schematic diagram showing data structures of disk 20, and parameters stored in the disk and in memory 16, according to an embodiment of the present invention. Disk 20 comprises a plurality of ranges 40, each range 40 comprising a multiplicity of data blocks 42 which may be written to and/or read from and which are used by PU 14 to store data of transactions. A range 41, referred to in more detail below, is a specific range 40. Disk 20 also comprises a region 44, wherein are stored, for each range 40, respective values of local counters 46, shown in FIG. 2 as LC 1, LC 2, . . . . Each local counter 46 has a value of a local parameter of its respective range. A global counter 48, which is also typically stored in region 44, has a value of a global parameter for all the ranges. The value of the global parameter may be derived from the values of the local parameters. By way of example, hereinbelow each local counter 46 is assumed to have a value of the number of free data blocks 42 in its respective range 40, and global counter 48 has a value of the free data blocks of all ranges 40, derived from summing local counters 46. Other local and global parameters, the values of which may be stored as local and global counters, will be apparent to those skilled in the art. For example, other parameters are the number of local and global used data blocks. All such parameters are assumed to be within the scope of the present invention.

Figure 3:
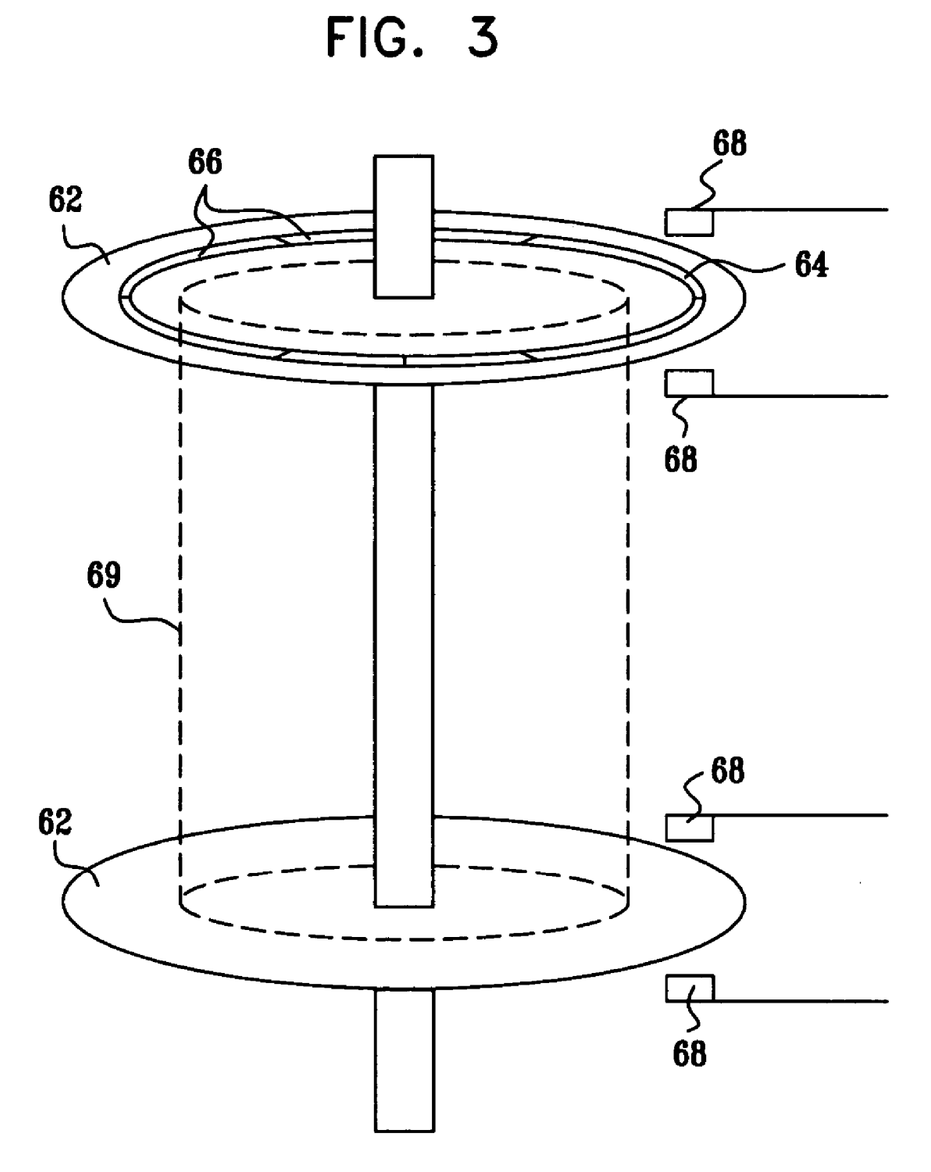
FIG. 3 is a schematic diagram showing a physical structure of the disk, according to an embodiment of the present invention.

FIG. 3 is a schematic diagram showing a physical structure of disk 20, according to an embodiment of the present invention. Disk 20 typically comprises a number of platters 62 rotated by a central spindle. Each platter is divided into circular 1-bit wide tracks 64 which are divided into sectors 66, a sector having a fixed number of bytes of data, such as 512 bytes. The tracks are read in tandem by heads 68 as the platters rotate, and a cylinder 69 is comprised of the set of tracks read by the heads of all the platters at a single seek position. The number of sectors per track varies with the radius of the track on the platter. The outermost tracks hold more sectors than the inner ones, and also spin faster under the head than do inner tracks. Each range 40 is assumed to comprise one or more sectors.

Each local counter 46 has a read-time, consisting of the time for reading of the counter by a specific head 68 after receipt of a read command. The read-times for any specific counter are variable, being dependent on a position of the specific head 68 when the read command is received, as well as on other factors, known in the art, such as the speed of revolution of the disk and a density of the tracks on their platters. Region 44 (FIG. 2) is implemented so that values of local counters 46 stored therein may be read from the region in as short a time as possible. In order that local counters 46 may be read in a minimum time, region 44 is chosen so that the read heads of the disk move minimally during the read process. Thus, region 44 typically comprises one or more contiguous sectors and/or tracks, so that the read-times of each sector or track are minimized. Alternatively or additionally, region 44 comprises one or more contiguous cylinders. Advantageously, the tracks for region 44 are outermost tracks of the disk, so that counters 46 stored therein may be read in as short a time as possible.

Referring back to FIG. 2, PU 14 uses software 26 to generate the following data structures, and to store their values on disk 20:

Max_concurrent_trx 50, also referred to herein as MCT. This is the maximum number of concurrent transactions that system 10 is able to operate with.

Max_trx_allocation 52, also referred to herein as MTA. This is the maximum disk space that can be allocated for use by a single transaction.

Optionally, PU 14 may also store on disk 20 a Max_concurrent_reservation 54, also referred to herein as MCR, which is the maximum amount of disk space that can be concurrently reserved. Alternatively or additionally, PU 14 calculates the value of MCR as needed. MCR is derived from MTC and MTA according to equation (1):

$$MCR = MCT \times MTA \qquad (1)$$

During operation of system 10, PU 14 generates a transaction journal 53 of operations performed by the system. Transaction journals are well known in the art, and are described, for example, in *Transaction Processing: Concepts and Techniques*, referred to in the Background of the Invention. Journal 53 is described in more detail below.

A block state table 49, showing data blocks 42 as being in either a free state, a pre-allocated state, or an allocated state, is also stored on disk 20. The free state comprises blocks that are available for writing data to, the allocated state comprises blocks to which data may not be written to, and the pre-allocated state comprises an intermediate state which will be converted either to a free state or to an allocated state on completion of a transaction.

At initiation of system 10, PU 14 reads values of global counter 48, MCT, MTA, and MCR, into volatile memory 16, for use in performing transactions. During normal operation of system 10, PU 14 maintains these values in memory 16. In the event of a system failure the processing unit performs a recovery operation to recover the values. Recovery operations are described in more detail below.

PU 14 also reads into memory 16 a table 51, as a copy of table 49, and updates table 51 in the memory according to the transactions which the processing unit performs.

In addition, PU 14 maintains an inconsistent-counter 56 in memory 16. The value of inconsistent-counter 56 reflects uncommitted changes to counter 48. The values of global counter 48 and of inconsistent-counter 56 are also respectively referred to herein as GC and IC. Also maintained in memory 16 is a lock 58 for inconsistent-counter 56, as well as locks 60 for respective ranges 40. Each lock allows or denies access to its respective entity. The functions of the variables held in memory 16 is described in more detail below.

Figure 4A:
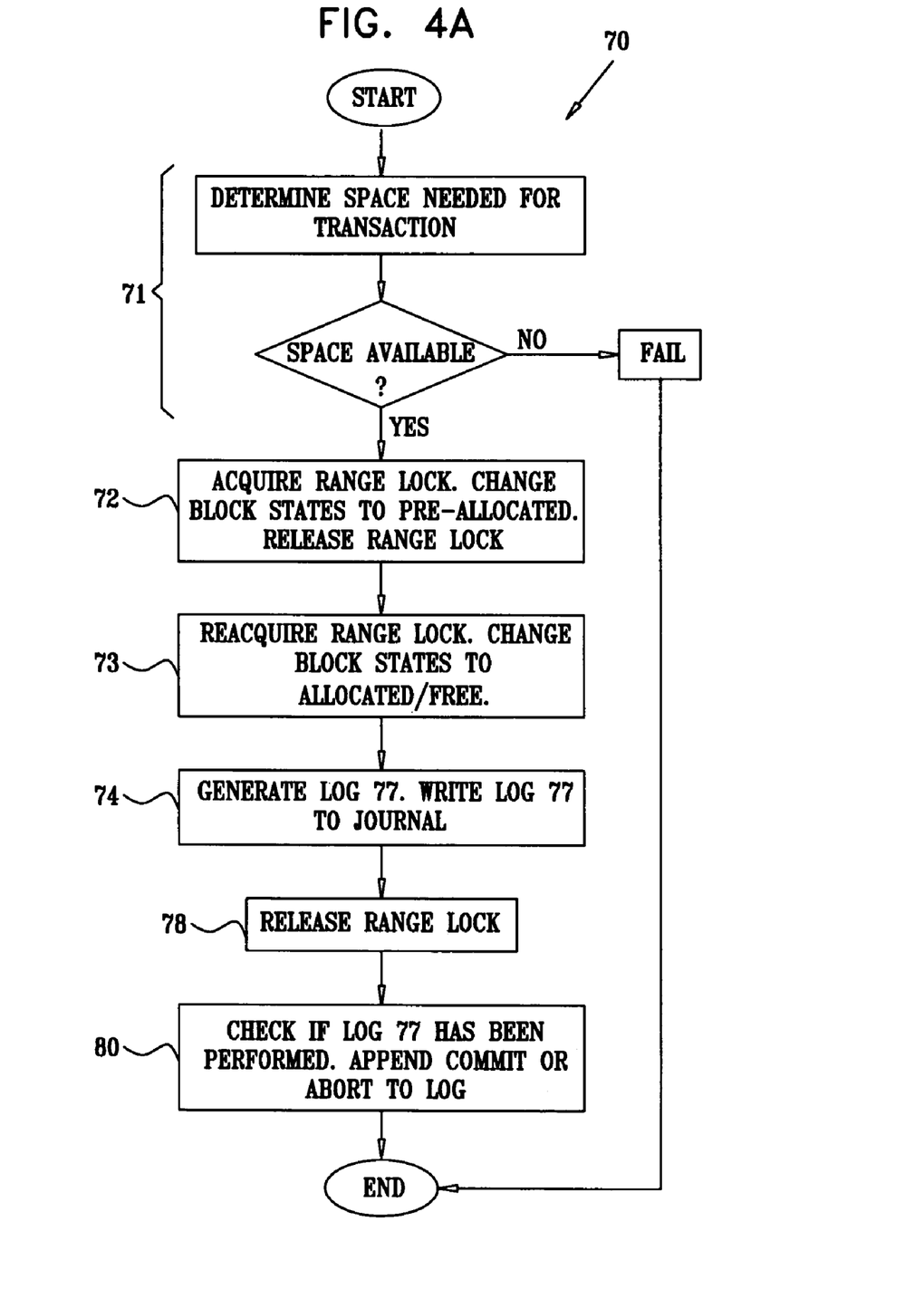
FIG. 4A is a flowchart showing steps performed by a transaction manager to process a transaction, according to an embodiment of the present invention.

FIG. 4A is a flowchart 70 showing steps-performed by transaction manager 30 to process a transaction, according to an embodiment of the present invention. By way of example it is assumed that the transaction performed is initiated by host 22, and comprises writing to disk 20.

In an initial step 71, manager 30 determines space needed on disk 20 to perform the transaction. The manager checks if there is sufficient free space available on the disk to perform the transaction by acquiring lock 58 and checking that the following expressions are true:

$$IC > MCR \quad (2)$$

$$IC \geq RES \quad (3)$$

where IC, MCR are as defined above, and where RES represents the space needed for the transaction, as determined by manager 30.

Expressions (2) and (3) being true ensures that |GC−IC| is always less than MCR.

If expressions (2) and (3) are true, manager 30 decreases IC to reflect the value of RES, releases lock 58, and determines, using table 51, one or more ranges 40 which comprise blocks to which the data of the transaction may be written to. Hereinbelow, by way of example, it is assumed that range 41 (comprised in ranges 40) is required for the transaction data being written to disk 20.

If either of expressions (2) or (3) are not true, manager 30 returns a failure, typically setting an alert that the transaction may not be processed, releases lock 58, and terminates flowchart 70.

In a second step 72, manager 30 acquires the lock of range 41. In table 51 the manager changes the states of blocks of range 41 to pre-allocated, according to the value of RES, and according to blocks that are listed in the table as being free. Manager 30 then releases the lock of range 41.

Manager 30 proceeds to a step 73 just before the manager is ready to commit the transaction. In step 73, manager 30 reacquires the lock of range 41, and changes the blocks that have been marked pre-allocated to an allocated state, assuming that data is to be written to the blocks. In the case that data is to be erased from the block, the pre-allocated state is changed to free.

Manager 30 then continues to a log generation step 74. In step 74, manager 30 first generates in memory 16 a log 77 to be entered into transaction journal 53, and after generation the log is written to the journal. Log 77 comprises a list of operations that are to be performed on disk 20 for the transaction being processed. Log 77 typically begins with a statement Begin_transaction, and is described in more detail with reference to FIG. 4B below. The log generated typically comprises a complete list of statements for the particular transaction being implemented, except for a final commit_transaction or abort_transaction statement.

Figure 4B:
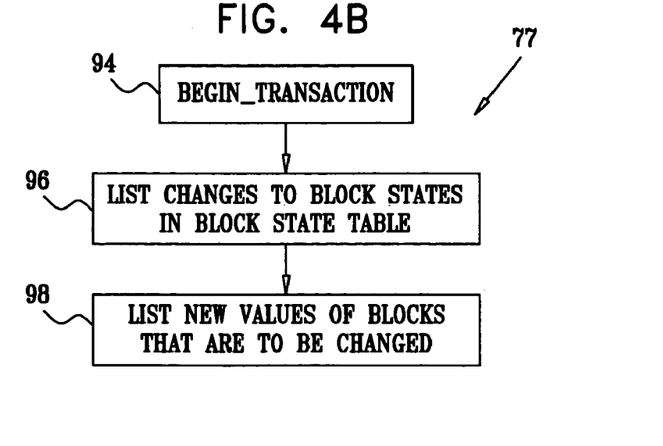
FIG. 4B illustrates a transaction log, according to an embodiment of the present invention.

FIG. 4B illustrates log 77, according to an embodiment of the present invention. Log 77 comprises a sequence of computer statements and/or operations which are written to disk 20. A first operation 94 comprises a Begin_transaction statement, indicating that a transaction is beginning. A second operation 96 lists changes to the state of blocks of range 41 of table 49 of disk 20. The change is typically from a free state to an allocated state. A third operation 98, lists the new values of the blocks to be modified, as needed by the transaction. However, the respective local counter of the range 41 is not updated accordingly.

Returning to FIG. 4A, in a completion step 78, after the log has been written to journal 53, manager 30 releases the lock of range 41.

In a final step 80, manager 30 receives notification that all the operations of log 77 have been successfully performed, and then appends a commit_transaction statement to the log, indicating that the transaction was committed successfully. If manager 30 does not receive the notification, it undoes the operations already performed, and then appends an abort_transaction statement to the log.

It will be appreciated that adding a pre-allocated state to table 51 increases the size of the table, compared to tables having just the two states of free and allocated. However, the added state allows a reduction in the time during which the lock for range 41 is held by the transaction being processed. This is because the lock is released after step 72, and is only reacquired at step 73, just before manager 30 is ready to begin committing the transaction by writing the log to the journal. Reducing the time that the lock is held enables the manager to access range 41 for other transactions, and thus effectively increases the concurrency of range 41.

From inspection of FIG. 4A and FIG. 4B, it will be appreciated that, at completion of the transaction, there are a number of inconsistencies in the stored values:

The value of global counter 48 as stored on disk 20 is different from the value of inconsistent-counter 56 IC.

There is an inconsistency between the values of the local counter of range 41 and the actual number of free blocks in the range.

During normal operation of facility 12, the first inconsistency is remedied by writing the value of IC to disk. The second inconsistency is also remedied by writing the correct value of the local counter to disk, ensuring that this value is written after log 77 has been written to journal 53. Also during normal operation of facility 12, PU 14 typically performs a checkpoint operation at regular intervals to clear journal 53 of committed transactions.

As described below, in the event of a failure of facility 12, all the inconsistencies are removed during recovery from the failure.

Figure 5:
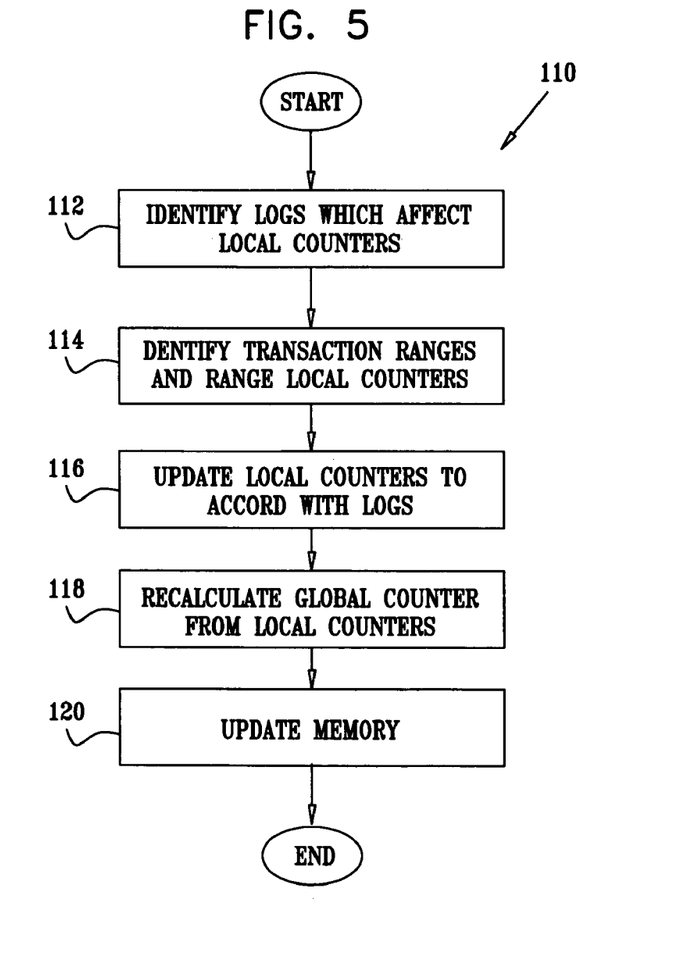
FIG. 5 is a flowchart showing steps performed by the transaction manager during a recovery operation, according to an embodiment of the present invention.

FIG. 5 is a flowchart showing steps performed by manager 30 during a recovery operation 110, according to an embodiment of the present invention. Manager 30 performs recovery operations such as operation 110 to ensure that data written to disk 20 is consistent after system 10 has suffered a failure.

In a first step 112, manager 30 identifies the logs of journal 53 which have been stored on disk 20 and which have at least one entry affecting local counters 46. Such entries correspond to operations 96 and 98 (FIG. 4B).

In a second step 114, for each transaction log identified in step 112, manager 30 identifies from the log the one or more ranges 40 involved in the transaction and the respective local counters 46 of the ranges.

In a third step 116, manager 30 updates the respective local counters 46 of ranges 40 identified in step 114, according to the data written in the transaction's log. This step removes the second inconsistency listed above.

In a fourth step 118, the value of global counter 48 is recalculated by reading then summing all local counters 44. This step removes the first inconsistency listed above.

In the event of a failure of facility 12, all data is typically lost from memory 16. Thus, in a final step 120, manager 30 rewrites the appropriate values of the entities in disk 20 to the memory.

It will be appreciated that in the recovery operation of FIG. 5, the time spent on recalculation of global counter 48 is a function of the number of committed transactions written into journal 53. Furthermore, since all the local counters are located together in a region of disk 20, so that the time to access them is minimized, the time to perform a checkpoint or a recovery is of the order of, or less than, the size of journal 53. This contrasts with prior art systems where local counters are distributed over disk 20, so that a time to access them is of the order of a size of the disk.

It will furthermore be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for tracking transactions performed on a non-volatile storage medium that includes a plurality of storage ranges, the method comprising:

assigning respective local counters to the plurality of storage ranges, the local counters having respective local counter values;

storing the local counter values together in a selected region of the non-volatile storage medium;

updating the respective local counter values stored in the selected region responsively to the transactions performed on the storage ranges to which the local counters are respectively assigned;

maintaining respective logs for the transactions;

in response to a failure of the non-volatile storage medium, identifying from the respective logs correct local counters and incorrect local counters;

reading the local counter values of the correct local counters from the selected region;

recalculating the incorrect local counters to determine recalculated values thereof; and combining the read local counter values together with the recalculated values in order to determine a global counter value for all the storage ranges.

2. The method according to claim 1, wherein the non-volatile storage medium comprises a disk, and wherein the selected region comprises a contiguous region of the disk.

3. The method according to claim 1, wherein the non-volatile storage medium comprises a disk, and wherein the selected region comprises a cylinder of the disk.

4. The method according to claim 1, wherein the local counters each have a respective time of reading, and wherein storing the local counter values comprises locating the local counters within the selected region so that a total of the times of reading is a minimum.

5. The method according to claim 1, and comprising writing a journal indicative of the storage ranges to the storage medium, and wherein updating the respective local counter values comprises reading the journal to determine the storage ranges.

6. The method according to claim 1, wherein the local counter values comprise respective numbers of data blocks in the storage ranges, and wherein the global counter value comprises a total of the numbers.

7. The method according to claim 1, wherein each of the storage ranges comprises a multiplicity of data blocks, the method further comprising generating a table comprising one or more states of each of the data blocks.

8. The method according to claim 7, wherein the one or more states comprise a free state wherein the data block is available to be written to, an allocated state wherein the data block comprises data, and a pre-allocated state from which the data block transfers to one of the free and the allocated states on or before completion of one of the transactions.

* * * * *